United States Patent [19]
Spayth

[11] 4,013,958
[45] Mar. 22, 1977

[54] SAMPLED COMMUNICATION SYSTEM
[75] Inventor: Frank J. Spayth, Fort Wayne, Ind.
[73] Assignee: The Magnavox Company, Fort Wayne, Ind.
[22] Filed: Oct. 14, 1975
[21] Appl. No.: 621,889
[52] U.S. Cl. .................................. 325/55; 343/177
[51] Int. Cl.$^2$ .......................................... H04J 3/12
[58] Field of Search ...................... 325/55, 57, 64; 179/41 A, 15 BZ; 343/176, 177, 175, 200

[56] References Cited
UNITED STATES PATENTS

| | | | |
|---|---|---|---|
| 3,173,996 | 3/1965 | Rypinski, Jr. | 343/177 |
| 3,535,636 | 10/1970 | Muilwijk | 325/55 X |
| 3,631,497 | 12/1971 | Leonard | 343/179 |
| 3,688,195 | 8/1972 | Muller | 179/41 A |
| 3,707,679 | 12/1972 | Bruley | 325/55 X |

*Primary Examiner*—Benedict V. Safourek
*Attorney, Agent, or Firm*—Thomas Briody; William J. Streeter; Joe Barbee

[57] ABSTRACT

A communication system apparatus and method for increasing the number of users accommodated by one or more communication channels. Time sharing of the one or more communication channels by a plurality of separate groups of users is provided as a function of user access demand, and channel occupancy. The one or more communication channels are periodically sampled by the user apparatus for detection of signals present on the channels whereby the occupancy status of each one of the scanned channels is determined. Transmission of signals from the user apparatus on each individual one of the channels detected as occupied by other users, is prevented for a predetermined length of time after each said detection of occupancy. Transmission of signals from the user apparatus is permitted on the channels detected as clear or unoccupied. The apparatus additionally provides for detection of each channel having signals addressed to the user and for transmission of reply signals from the user on the detected channel. The described system requires no central control station and is not dependent upon the use of special signals transmitted from an active user apparatus for marking an occupied channel. Some or all of the communication channels of the system can be used in common with other existing and conventional communication systems without resulting in interference with the existing communication system.

15 Claims, 10 Drawing Figures

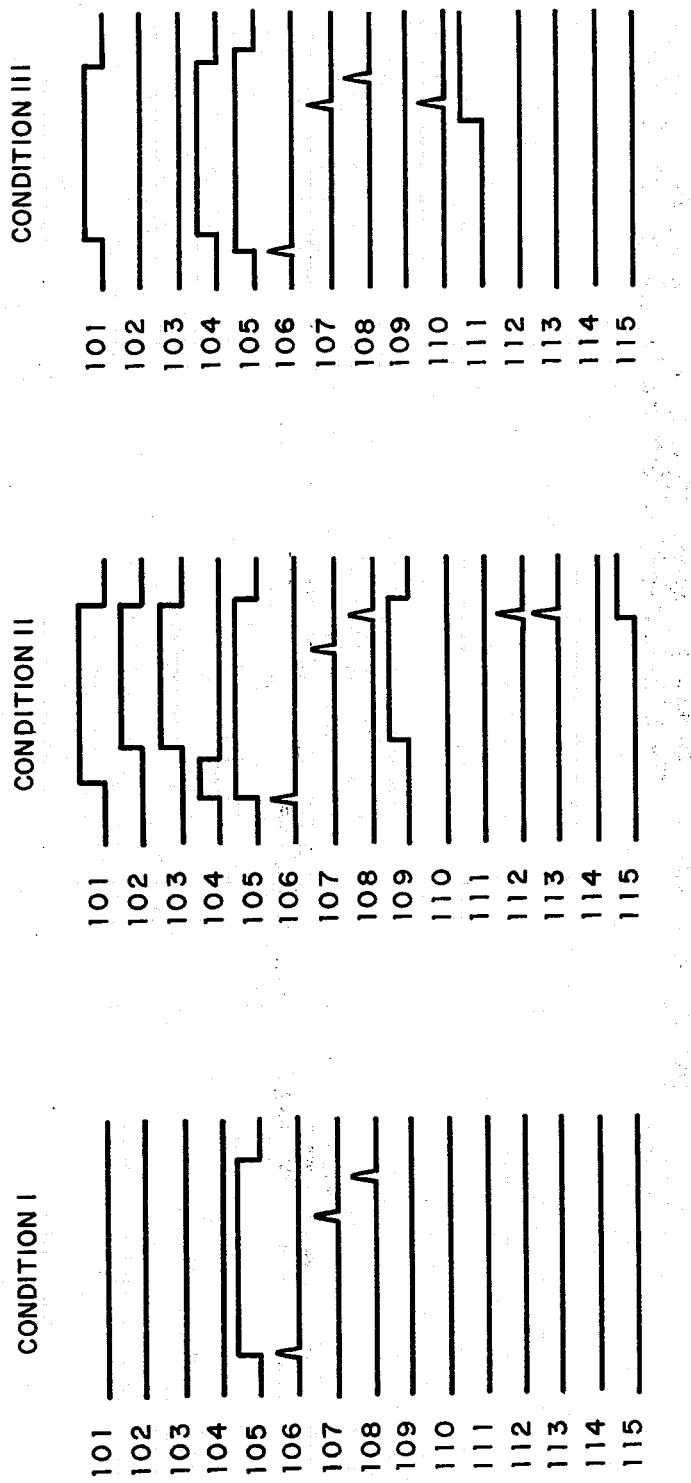

SAMPLED COMMUNICATION SYSTEM

BACKGROUND OF THE INVENTION

This invention relates to communication systems and more particularly to radio communication systems which operate to conserve radio frequency spectrum by controlled sharing of one or more narrowband communication channels with a plurality of users and which are not dependent for such operation upon the use of a central control apparatus or the use of special signals for marking channel occupancy.

With an ever increasing need and use of commuication systems and particularly those systems using radio as the transmission link, the problem of providing space in the radio frequency spectrum for each new user is fast becoming insolvable.

In the past, numerous methods of radio communication have been devised including time and frequency division systems and hybrid combinations of these systems as well as complex signal correlation methods to achieve access and address capabilities. These prior art systems, for the most part, have been complex in nature and costly and generally have not been entirely satisfactory or practical to implement as evidenced, in part, by the general lack of acceptance and utilization in the communication field.

Another solution to the spectrum problem has been described in "Communications System Engineering Handbook" by Hamsher and published by McGraw-Hill, reference page 18-5. In this solution, as in the present invention, each user is provided with access to a common pool of communication channels. Further, in this solution, the user selects and occupies a free channel and protects its' use from others by the use of a "busy" signal. The user can than ring a desired user and can communicate with him on the acquired channel.

The use of so called "busy" or "off hook" signals to mark an occupied channel as described by Hamsher is not desirable. Continuous transmission of such signals require transmitters capable of continuous duty which from an economic standpoint, greatly increases the cost of the transmitting equipment. The need of a tone control marker also implies a costly central control station. The use of such signals to mark an occupied channel, whether or not the signals are continuous or intermittent in nature also increases the complexity of the system since a means must be provided to both transmit and receive the signal along with the normal communication signals. The time duration of the transmitted signal is also important since the shorter the time duration, the greater the probability of misdetection. Such misdetection could occur for example, when short bursts of signal are transmitted at the beginning and/or end of each communication signal transmission. In view of this possibility, the detectability criterion of the busy signals should be well below the threshold of the normal voice or communication signals. This requirement, of course, increases both the complexity and cost of the system. The transmission of such "busy" signals for any time during other than continuous also greatly increases the probability of not receiving the signal at all, during a sampling period when the communication channels are periodically sampled for occupancy status as in the herein disclosed present invention.

In view of the foregoing, it should now be understood that it would be desirable to provide an improved communicative system that would solve the above and other problems.

Accordingly, one of the subjects of the present invention is to provide a communication system which enhances the use and efficiency of one or more communication channels which is simple and reliable in operation and which is particularly suitable for use with existing narrow band communication channel assignments.

It is another object of the present invention to provide a communication system in which sharing of one or more communication channels by a plurality of users is controlled solely by user apparatus, thereby not requiring a central control station.

It is yet another object of the present invention to provide user apparatus for sampling the communication signals on each one of a number of communication channels and for controlling the transmission of signals from the user apparatus on each of the sampled channels as a function of the sampled communication signals.

It is still another object of the present invention to provide a user apparatus for periodically sampling the communication signals on one or more communication channels for detecting channel occupancy and prohibiting transmission of signals from the user apparatus on each one of the channels detected as occupied for a predetermined length of time after the detection of communication signals.

Studies of private radio communication networks such as for example those used in public safety, industrial, and land transportation radio services indicate that greater than 66 percent of the communication channels presently assigned by the FCC to such users are actually in use less than 10 percent of the total possible use time. Such limited and inefficient use of the communication spectrum is, of course, undesirable from the standpoint of spectrum conservation.

The present invention takes advantage of communication channels with these relatively low duty cycle users by sharing them with other low duty cycle users. The disclosed system operates with minimal operator control and is not dependent upon a central control equipment or the use of special signals for identifying a channel occupancy, thus there is provided a practical, simple, and relatively inexpensive solution for increasing the use efficiency of existing communication channels with low duty cycle users.

The sampled communication system of the present invention uses a channel-scanning approach to define the availability of a channel. Also, the channel is sampled and the information is held for decision purposes. The capability is achieved by local control at the transceiver thereby not reguiring a central control station.

SUMMARY OF THE INVENTION

In accordance with my invention, one or more communication channels are time shared by a number of separate users. The communication channel utilized by a particular user at a particular time is controlled by the user apparatus as a function of channel availability at the time of desired use by the user. The user apparatus, as will be described in greater detail herein later, comprises a multi-channel receiver and transmitter and associated signal sampling and control circuitry.

Each user apparatus periodically scans the one or more communication channels and samples the normal communication signals present on the scanned channels for detection of those channels in use of occupied by other users in the system and determination of those channels which are unoccupied or clear. The channels are also sampled by the user apparatus for detection of signals addressed or directed to the user apparatus. As will be later apparent, the scanning and sampling of the channels by each individual user apparatus in the system can occur either in a sequential or random order in order to distribute the user activity on one or more of the communication channels in the system as may be desired. Scanning may be started at a predetermined channel whenever scanning is initiated. Although the scanning of the channels can be in a sequential order, the channels themselves need not be contiguous with respect to one another.

The control circuitry of the user apparatus responds to the sampled signals on the scanned channels and operates to either permit or prohibit the transmission of signals from the user apparatus on each one of the sampled channels. The control circuitry also operates to provide control of the channel scanning and sampling operation and provides the selection of the transmission channel of the user apparatus.

Transmission of signals from the user apparatus on each one of the channels detected as occupied by other users is prohibited for a predetermined period of time after detection while transmission on channels indicated as clear or unoccupied for a time period in excess of the above referenced predetermined time period, is permitted. The control circuitry also operates to provide transmission on those channels on which signals addressed or directed to the user apparatus are detected.

During the channel scanning operation and upon either the detection of an unoccupied channel, i.e., one on which no signals are detected for at least the referenced predetermined time period, or the detection of a channel having signals addressed to the user apparatus, the control circuitry operates to stop the channel scanning on the detected channel thus enabling the user receiver for continuous reception of signals on the so detected communication channel. The operation additionally provides enabling of the receiver audio output and the control of the user transmitter for transmission of signals on the corresponding detected communication channel.

Immediately following initial energization or turn-on of the user apparatus, the associated control circuitry provides for scanning and sampling of the communication for a time period sufficient to determine the use status of the channels. The control circuitry also prohibits transmission of signals from the user apparatus during this time period.

Following the termination of each separate transmission of communication signals from the user apparatus on a given communication channel, the associated control circuitry will permit continued transmission and reception of signals on the given channel for a predetermined time period prior to re-establishing the channel scanning and sampling operation. This feature prevents additional channel blocking time in the system in the event the user desires to either continue communication or establish new communication.

The subject matter which I regard as my invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 4a, 4b, 4c, 4d, 4e and 4f is a signal timing and level diagram showing the relationship of the signals in various portions of the block diagram of FIG. 3 under various operating and input signal conditions.

The exemplifications set out herein illustrate the preferred embodiment of the invention in one form thereof, and such exemplifications are not to be construed as limiting in any manner.

DESCRIPTION OF THE PREFERRED EMBODIMENTS

Figure 1:
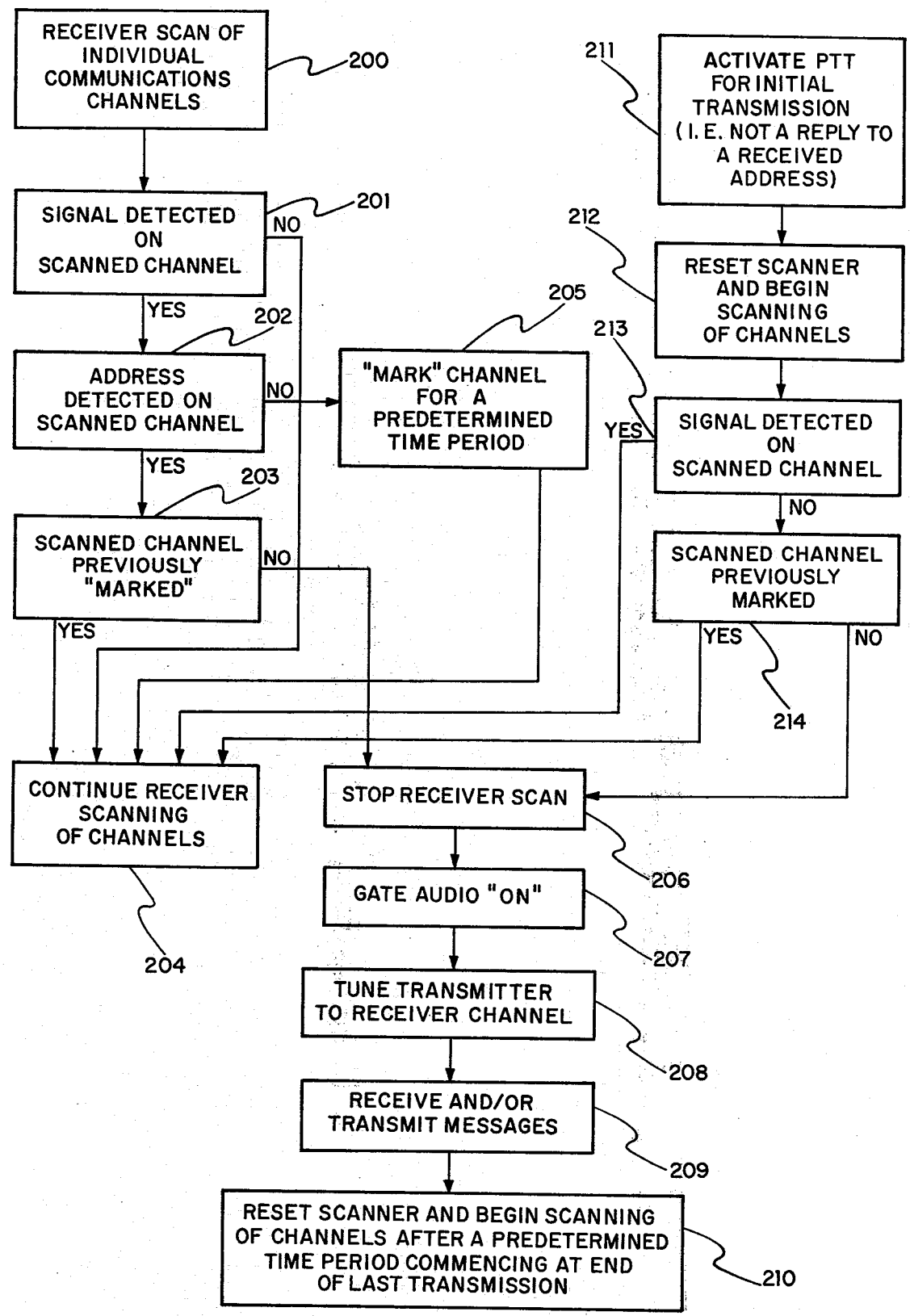
FIG. 1 is a function diagram useful in the understanding of my invention.
Figure 2:
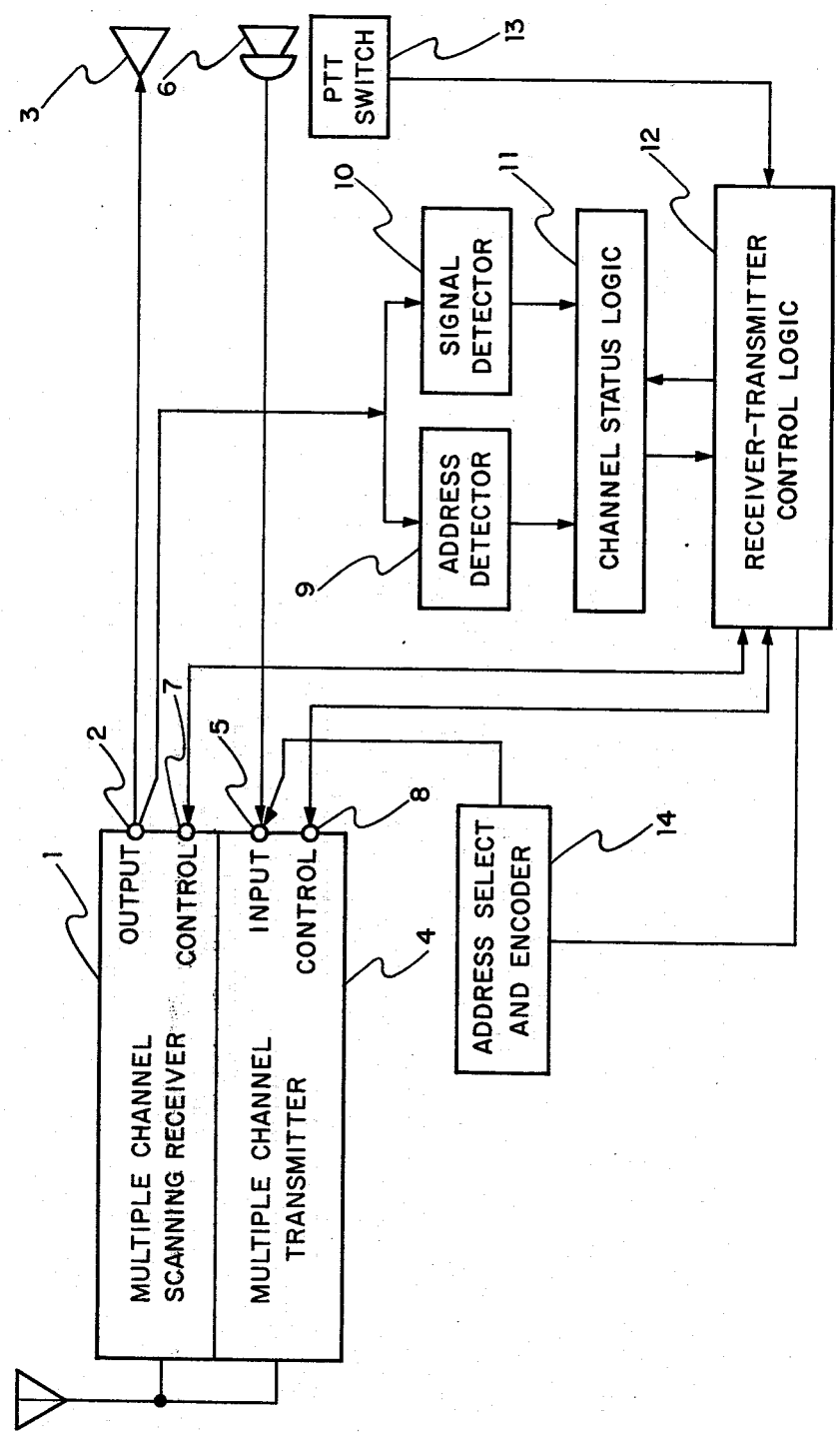
FIG. 2 is a simplified block diagram of a user-apparatus in accordance with my invention.

Referring to FIG. 1 there is shown a diagram of some of the various functions performed, and their general order of performance, by a user-apparatus in accordance with my invention such as that shown in FIGS. 2 and 3.

The user apparatus functions shown in FIG. 1 are divided into two basic portions. The first being the monitoring and sampling of one or more of the communication channels which includes the detection of "busy" channels or channels already in use by other users in the communication system as well as those "free" or unused channels. The first portion functions also include the detection of channels having transmisions addressed to the particular user apparatus described and the reception and the reply transmissions from the user apparatus resulting from these received address signals. The second basic portion relates to the user apparatus functions resulting from the activation of the push to talk switch (PTT) to intiate a transmission from the user apparatus. It should be noted that the later mentioned transmission is not one which is in reply to a received address, i.e., one directed to the particular user apparatus described but rather, it is a transmission addressed to another user apparatus in the communication system.

As evidenced by FIG. 1, the first function portion encompasses three salient conditions which can exist on a scanned channel. The first condition occurs when no signal and no address to the user apparatus is detected. This condition indicates a potentially unused or "free" channel. If the scanned channel has not been "marked" as being previously used by others in the communication system for a predetermined length of time, the scanned channel is then considered as an unused or free channel. The second condition occurs when a signal and address to the particular user apparatus is received and detected. Under this condition, the scanning and sampling of the communication channels is stopped and the user apparatus is conditioned for the reception and transmission of messages on that channel, providing the channel has not been "marked" as having been used by others in the communication system for a predetermined length of time. The third condition occurs when a signal not addressed to the particular user apparatus is received and detected. This condition indicates a "busy" channel or one being used by others in the communication system. Under this condition, the channel is "marked" for a predetermined period of time during which period, transmission of signals from the particular user apparatus is prevented on the marked channel. It should be noted that after a channel has been marked, the receiver of the user apparatus will continue its scanning and sampling of the channels in the communication system. It should also be noted that after termination of each transmission from the particular user apparatus, the receiver and transmitter will remain on the channel for a predetermined length of time after which time period the scanner will be reset to start rescanning and sampling of the channels.

The aforementioned second function portion shown by FIG. 1 which relates to the transmission from the user apparatus also comprises three salient conditions. Activation of the PTT (Push-to-talk) for initiating transmission to another user apparatus, which initial transmission is not in reply to a received address, causes the resetting of the scanner and the scanning and sampling of the communication channels. The first of the latter mentioned salient conditions occurs when a signal on the scanned channel is received and detected. Under this condition, transmission on this channel from the user apparatus is prohibited and the receiver is caused to continue scanning of the communication channels. Note that under this first condition the next channel scanned and sampled is the next channel in the order of scan i.e., the scanner is not reset to start scanning from the first channel in the order of channel scanning. The second condition occurs when no signal on the scanned channel is received and detected but the scanned channel was previously in use and "marked" as such. Under this condition, as in the first condition, transmission from the user apparatus is prohibited and the receiver is caused to continue the scanning of the communication channels. The third salient condition occurs when no signal is detected on the scanned channel and the channel is not "marked" as previously used within the predetermined time period. Under this third condition, transmission from the user apparatus is permitted. It is, of course, understood that this includes the transmission of an address code directed to a selected user apparatus with which communication is desired.

It will be apparent herein later that some of the functions shown in FIG. 1 can occur substantially simultaneously and can be provided by common circuitry.

Briefly, in FIG. 1 scanning of individual channels occurs in block 200. Block 201 samples the scanned channel for a signal. If a signal is received, the signal is checked to see if it contains the users of receivers address by block 202. If the user's address is present, block 203 determines whether the channel was previously marked. The mark is an internal signal that indicates to the user the availability of that particular channel. If the channel was previously marked it means that the addressed message has been received therefore block 204 indicates that scanning is continued. When no signal is detected by block 201, scanning proceeds as by progressing to block 204. If block 202 determines that the message does not contain the user's address the channel is marked by block 205 for a short period of time so that the user knows that channel has recently been in use or occupied and therefore the user will not employ that channel until after the marker disappears which in normal circumstances will insure that the occupants of that channel have finished. Once the channel is marked, scanning continues. When block 203 determines that the channel was not previously marked, operation continues to block 206 which stops the scanning. Block 207 gates the receiver's audio to "on" while block 208 tunes the transmitter to the proper channel. Messages are then received and responded to by the functions of block 209. At the completion of the communication, operation of the system passes to block 210 and the scanner is set to a predetermined channel and scanning continues. Block 211 indicates the activation of the PTT when it is desired to transmit a message. Activation of the PTT causes block 212 to reset the scanner to a predetermined channel and commence scanning for an unoccupied channel. Block 213 is the determination of whether a scanned channel is occupied or not. If the channel is occupied, scanning is continued by block 204. If the channel is unoccupied it is checked by block 214 to determine whether the channel was previously marked. If it was not previously marked, operation continues to block 206 to stop scanning. If the channel was previously marked, scanning continues on block 204.

Now referring to FIG. 2, there is shown a simplified block diagram of a user apparatus suitable for use in a communication system in accordance with my invention. A multiple channel scanning receiver 1 having an audio output terminal 2 is connected to a speaker 3. A multiple channel transitter 4 having an audio input terminal 5 is connected to microphone 6. The scanning receiver 1 is provided with a control terminal 7 for controlling the operation and channel scanning of the receiver 1. The transmitter 4 is also provided with a control terminal 8 for controlling the operation and the channel frequency of the transmitter 1.

The receiver 1 and transmitter 4 can, if desired, be a single transceiver type unit where common portions of both the receiver 1 and transmitter 4 are combined and shared. The transmitter 4 in the FIG. 2 apparatus as well as the embodiment of FIG. 3 is tuned by signals obtained from the scanner of receiver 1 so that channel frequency of transmitter 4 is identical and in synchronism with that of the receiver. It should, however, be understood that, if desired, the transmitter 4 can be tuned by signals other than those obtained from the receiver. In some operational situations, it may be desirable for the transmission and reception of signals at a given user apparatus to occur on different channels. Such a situation can occur when a signal repeater is used in a communication system.

The audio output of the scanning receiver 1 is supplied to and address detector or decoder 9 and also to a signal detector 10. Either one or both of these detectors can obviously be included in the receiver 1. The output signals from the address detector 9 and the signal detector 10 are supplied to the input of a channel status logic circuit 11. The address detector 9 responds to address signals and provides an output to the status logic circuit 11 whenever an address is received which is directed to the user apparatus described. The address can be of any desired and well known form. It can for example be comprised of one or more selected and predetermined audio frequencies in which case the address detector would provide an output in response to these selected frequencies. The address detector could, if desired, be comprised of audio frequency filters. Such detectors are well known and additional description is not necessary. The signal detector responds to the presence of a signal and provides an indication of such presence in the form of an output signal. Again, such signal or carrier detectors are well known.

The channel status logic 11 responds to the signals from the address detector 9 and the signal detector 10 as well as signals from a receiver-transmitter logic circuit 12 to establish the "use" status of the scanned communication channels and thereby provide signals to the control logic 12, indicative of the channel status of the scanned channels. A PTT switch 13 is also provided and is used to request transmission from the user apparatus. The PTT switch 13 is connected to the control logic 12 and supplies a signal indicative of such request to the control logic 12. The control logic 12 is interconnected to the respective control terminals 7 and 8 of the receiver 1 and transmitter 4. The control logic is also connected to an address select and address encoder 14. The output of the encoder 14 is supplied to the transmitter 4 by the control terminal 8. The control logic 12 responds to the signals from the status logic 11, PTT switch 13, as well as scanned channel information signals from the receiver 1 and transmitter 4 for providing control of the reception and transmission of communication signals to and from the described user apparatus on each of the scanned communication channels as was previously described in connection with FIG. 1.

Figure 3A:
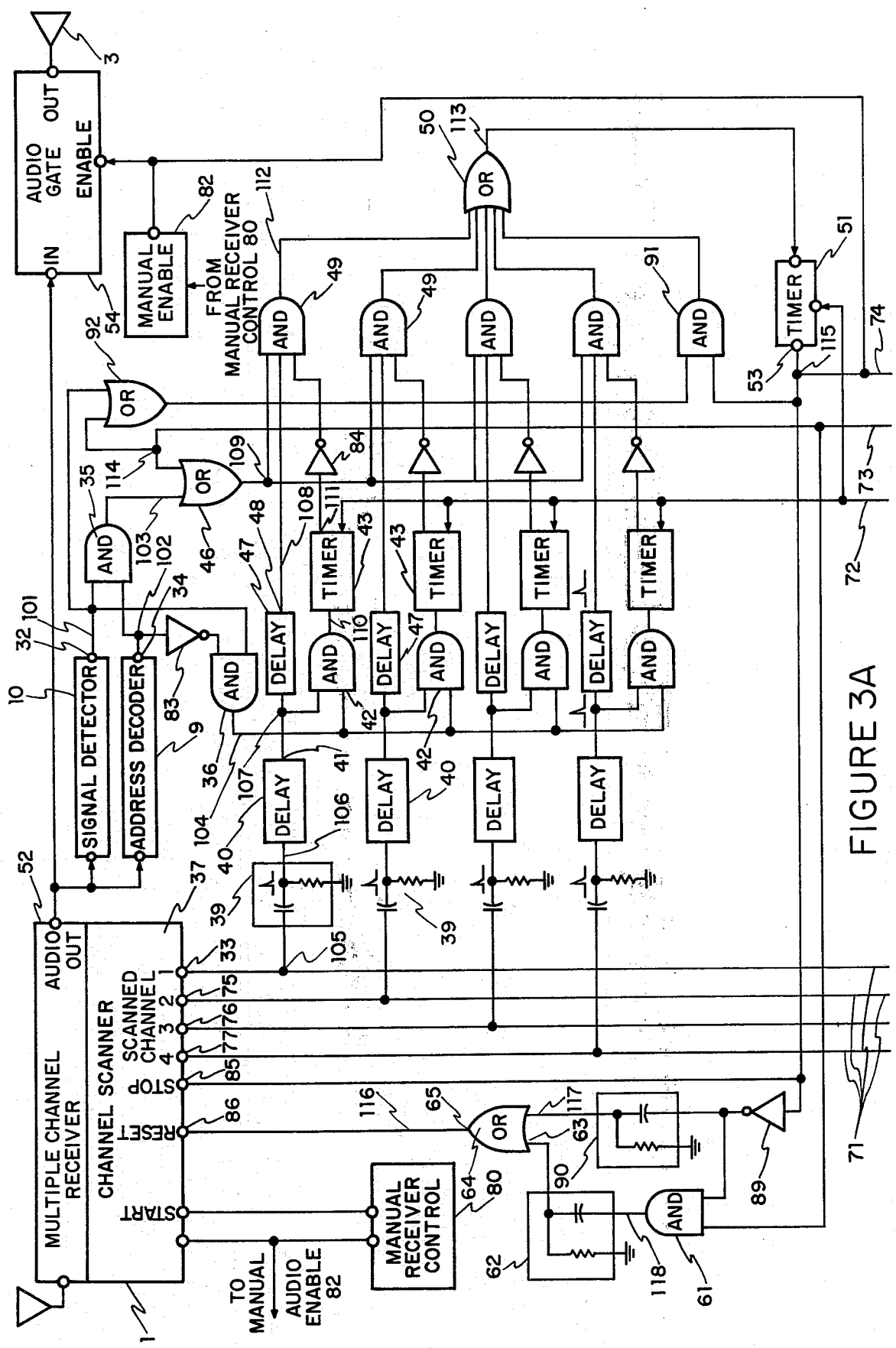
FIG. 3a and 3b combined is a detailed block diagram of one embodiment of the user-apparatus in accordance with my invention.
Figure 3B:
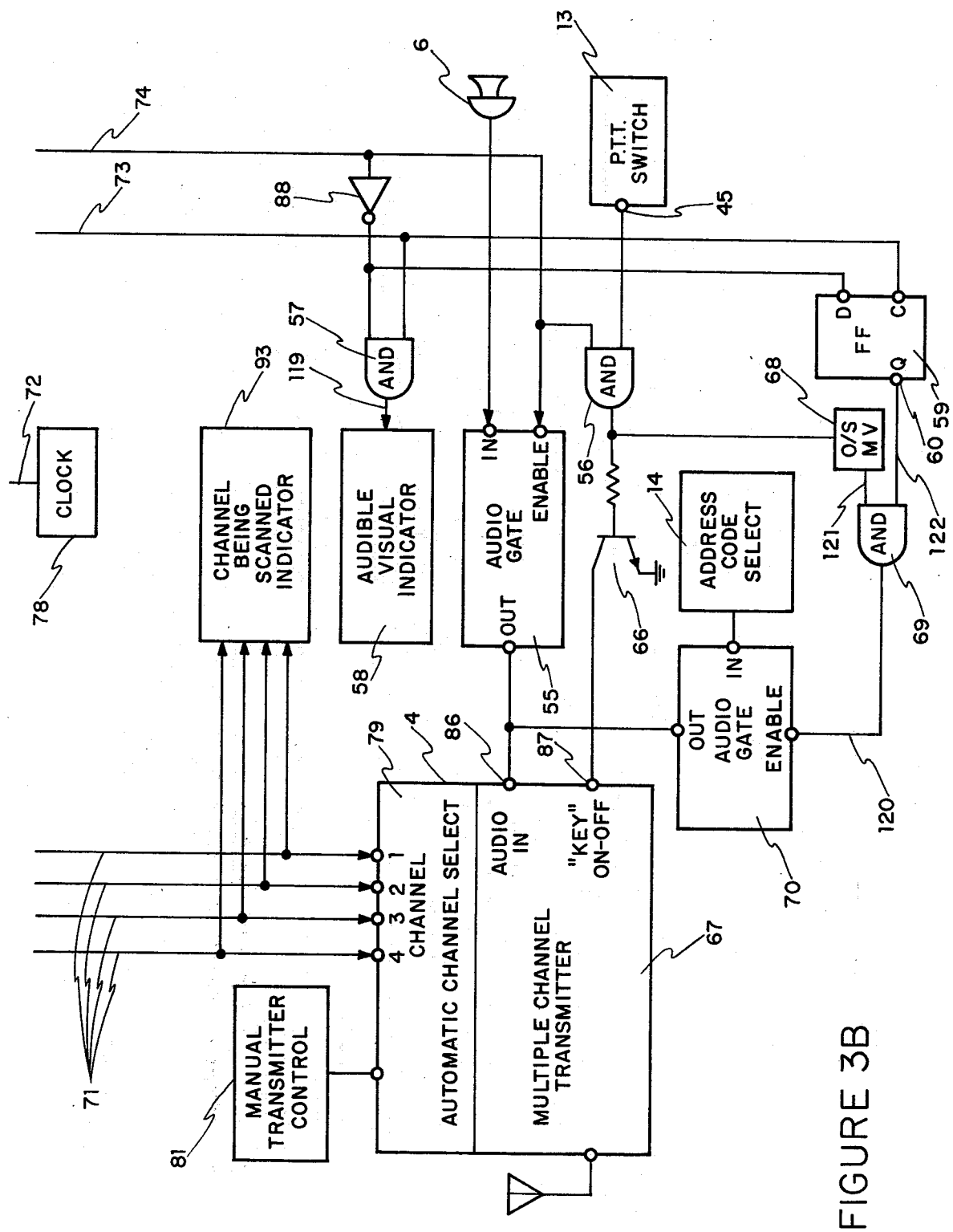
Figures 4D, 4E, 4F:
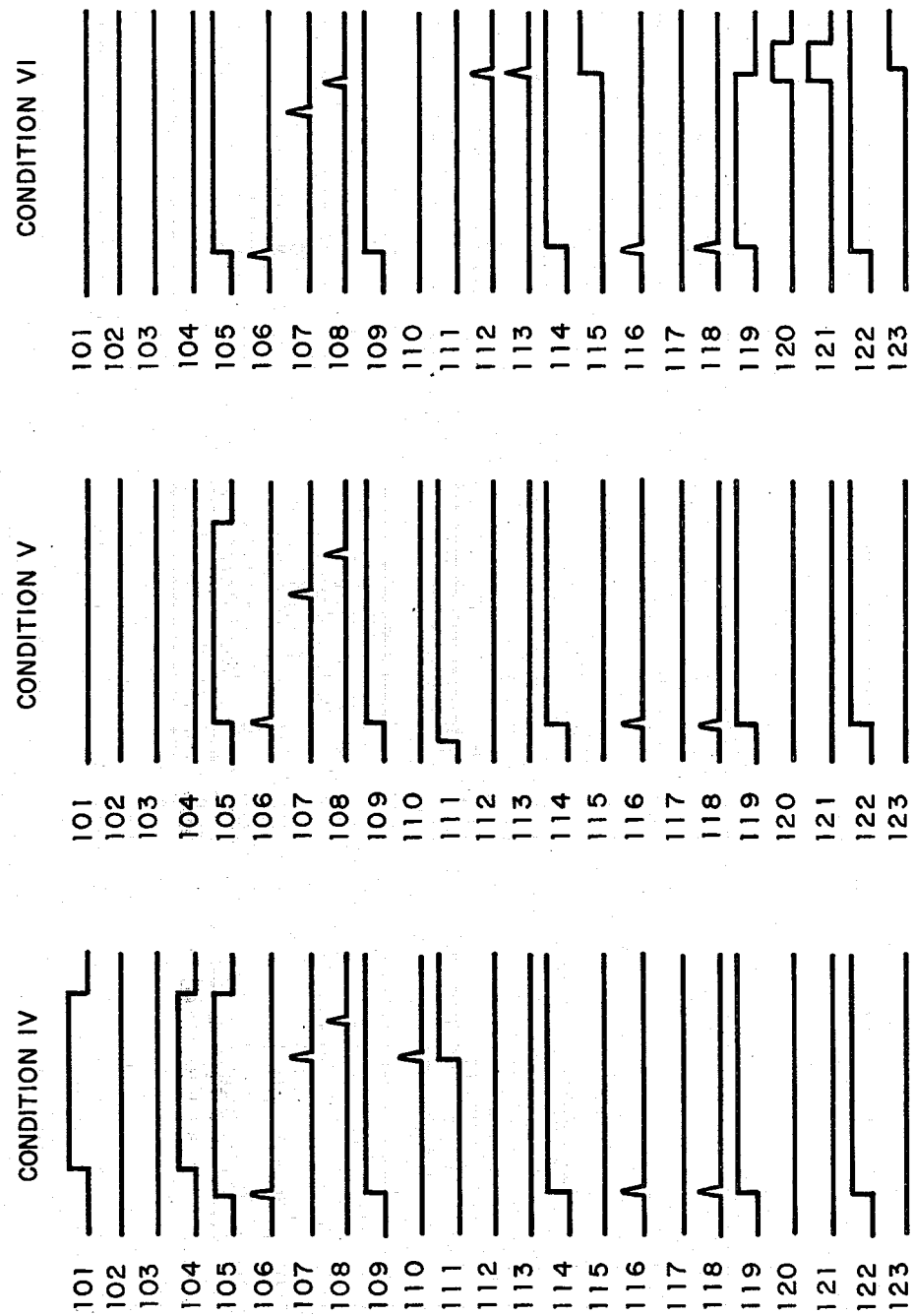

Now referring to FIGS. 3a and 3b combined, there is shown a detailed block diagram of one form of implementation of the user apparatus shown in FIG. 2. In FIGS. 3a and 3b, like numbered leads 71, 72, 73, and 74 interconnect the circuits of the two figures. In the description of the operation of the user apparatus of FIGS. 3a and 3b the digital signals are defined as either "high" or "low". This denotes the signal levels and they are equivalent to respective types of "1", true, or presence and "0" false, or absence logic signal states which are well known. The invention is not limited to the logic states or logic circuitry shown as will be evident to one skilled in the digital and logic art. The resistance, capacity differentiators of which differentiator 39 is typical are for the purpose of converting a constant high level signal into a short pulse. The operation of these differentiators are well known. The differentiators can be of a digital type, if desired, which are also well known in the art.

The signal level on each of the scanned channels lines 33, 75, 76, and 77 of the receiver scanner 37 is normally low but goes high during the time period that each respective channel is being scanned. The signal output level of the signal detector 10 and the address detector 9 is normally low but goes high when a respective signal or address is present. The timers 43 and 51 operate to count clock pulses from clock 78 for a predetermined number of counts. The timers 43, 43', 51 can be operated to represent any desired time period, however, in most communication applications of the user apparatus of my invention, time periods of from 15 to 90 seconds has been found to be most practical and provide the best "use" efficiency of the communication channels.

The signals from the channel scanner 37 and appearing on the interconnecting lines 33, 75, 76, and 77 are supplied to the channel select 79 of the transmitter 67. The channel select operates to tune the frequency of the transmitter 67 to the frequency of the channel being scanned by the receiver. The scanned channel signals appearing on the interconnecting lines 33, 75, 76, and 77 are also supplied to differentiators 39 and 39' as well as those unlabled differentiators. The primed reference numbers identify components which are identical to those components identified by the same but unprimed numbers. The primed numbers are in that portion of the circuitry associated with the indicated channel 2, with the same unprimed numbers associated with the indicated channel 1. It will be apparent to those skilled in the art that the identical but unnumbered components are associated with the indicated respective scanned channels 3 and 4. The manual receiver control 80, receiver audio enable 82, and the manual transmitter control 81 operate to provide manual receiver-transmitter operation when it is desired to override the automatic control provided by the user apparatus.

In the following description of the operation of the embodiment shown in FIGS. 3a and 3b, reference to the various functions provided and previously described and shown in FIG. 1 will be helpful in the understanding of the operation of the embodiment. The operation of the FIG. 3 user apparatus including the channel status logic as well as the control logic will be described for each one of the conditions previously described in relation to FIG. 1 function diagram. Indicator 93 indicates the channel being scanned.

I-No Signal and No Address Present

Under this condition in which no signal or address is present, the scanned channel is considered an "unused" or "free" channel providing it is not "marked" as being previously used by other uses in the communication system within a predetermined time period as determined by time 43.

Under a scanned channel condition where neither a signal or address is detected, the output signal of the signal detector 10 appearing on output terminal 32 and the output signal of the address detector or decoder 9 appearing on output terminal 34 will both be low. These low output signal levels are supplied as signal inputs to the AND gate 35 and thus result in a low output of the AND gate 35. The output of the signal detector 10 is also supplied to a first input AND gate 36. The output of the address detector 9 is supplied as an input to inverter 83. The output of the inverter 83 is supplied to a second input of AND gate 36 and thus the output of AND gate 36 is also low.

When the channel scanner 37 causes the receiver 52 to scan channel 1, a high level signal appears on scanned channel line 33 and is in turn supplied as an input signal to differentiator 39. The differentiator 39 functions to provide a positive going output pulse which is in turn supplied to the delay 40. The positive going pulse from differentiator 39 is coincident with the leading or rising edge of the high level signal on line 33.

The signal output of the delay 40 provides an output signal on output terminal 41. This output signal is a positive going pulse slightly delayed in time from the output signal from the differentiator 39. The purpose of this delay is to allow the signal detector 31 and the address detector 9 to settle on a decision. Thus the signal output of AND gate 36 is not in an undersirable changing state when the signal pulse at terminal 41 occurs. Since the output of AND gate 36 is low, the output of AND gate 42 is also low since a first input of AND gate 42 is supplied by the output of the AND gate 36. The output of the AND gate 42 is supplied to an enable terminal 110 of the timer 43. Thus with no output or a low output of AND gate 42, the timer 43 is not enabled and the signal output of the timer 43 remains low.

In condition I, the PTT switch 13 is not activated, and the output signal supplied by PTT13 on output terminal 45 is also low. Since the output from AND gate 35 is also low, the OR gate 46 provides a low level output signal. An input signal for delay 47 is provided by the output of the previously described delay 40. The delay 40 provides an output signal on output terminal 48 to one input of an AND gate 49. The purpose of the delay 47 is to provide sufficient time for the timer 43 to be activated or enabled by the output signal from AND gate 42 and thus prevent a race condition to exist at the input of AND gate 49. Because the signal output of the oR gate 46 is low, AND gate 49 does not pass the signal pulse output of delay 47. The signal output of the AND gate 49 is supplied as an input signal to an OR gate 50. Thus, the output of the OR gate 50 is low and the timer 51 is not activated. The timer 43 is used to "mark" a channel in use as will be later apparent. The timer 51 provides a predetermined time period before channel scanning is again activated after being stopped as also will later be apparent. The signal output of the timer 51 appearing on terminal 53 is directly supplied to the channel scanner 37 as a "stop" scan signal on terminal 85 and indirectly via other circuitry, to be described later, to a reset terminal 86. Thus under the described condition I, the scanning of the communication channels continues as indicated by the function diagram of FIG. 1.

II - Signal and Address Present

Under this condition, the output of the signal detector 10 and the output of the address detector 9 appearing on the respective output terminals 32 and 34 are both high, thus the signal output of the AND gate 35 is also high. When the channel scanner 37 causes the receiver 52 to scan channel 1, the signal on line 33 goes high. This high level signal causes the differentiator 39 to provide a positive going pulse coincident with the rising edge of the signal on line 33.

Delay 40 operates on its input signal from the differentiator 39 to provide a positive output pulse at its output terminal 41. The purpose of this delay is as previously described. With the resultant signal output of AND gate 36 low, the output of AND gate 42 is also low. Since the output of the AND gate 42 is low, the timer 43 is not activated and its output to the input of inverter 84 remains low.

As in the previous condition I, the PTT switch output to OR gate 46 is low; however, the output of the AND gate 35 is high, thus the signal output of OR gate 46 is high. With a high output from OR gate 46 and a high output from the inverter 84, the AND gate 49 passes the pulse output from the delay 47. The output of the AND gate 49 is supplied as an input to the OR gate 50, thus the OR gate 50 provides a pulse signal to the timer 51 which causes the timer 51 to be activated for a predetermined time period during which a high level signal is provided at its output terminal 53. This high level signal is supplied to the stop scan terminal 85 of the channel scanner 37 causing the receiver to stop channel scanning and remain on the indicated channel 1 for the continued reception of the signal which was addressed to the user apparatus.

The high level output signal from the timer 51 is also supplied to the audio gate 54 to enable the audio output of the receiver 52. The audio gate 54 can, if desired, be a gated amplifier.

The high output signal from the timer 51 is also supplied to the audio gate 55 which is similar in operation to the audio gate 54. With the audio gate 55 enabled, audio input signals from the microphone 6 are supplied to the transmitter 67 at audio input terminal 86 for modulating the transmitter 67 when the PTT switch 13 is activated. Activation of the PTT switch by the user or operator, provides a high level signal, during activation, to an input of AND gate 56. A high level signal is thus provided from the AND gate 56 to the base of the keying transistor 66. The transistor 66 operates as a keying switch to provide a key terminal 87 of the transmitter 67. Thus signals on the scanned "free" channel, which in this example is channel 1, can be received and transmitted by the user apparatus.

III - Signal Present, No Address

Under this scanned channel condition where a signal is detected which is not addressed to the particular user apparatus, the channel is considered to be "busy" or "in use" by other users in the communication system.

In this condition of the scanned channel, the signal output from the signal detector 10 is high while the signal output from the address detector 9 is low. While the channel scanner 37 scans channel 1, the output signal on line 38 goes high from a normal low state in the unscanned state. Differentiator 39 thus provides a positive going pulse coincident with the leading edge of the signal appearing on lead 38. With these signal level conditions present, the AND gate 36 provides a high level output since the low level signal at the address detector output terminal 34 is inverted by the inverter 83.

Dealy 40 provides a delayed positive output on output terminal 41 from the input pulse supplied by the differentiator 39. Since the output of the AND gate 36 is high, the output of the AND gate 42 is a positive going pulse which enables or activates the timer 43. The timer 43 thus provides for a predetermined time period a high level output signal to the inverter 84. This predetermined time period during which the timer is activated is used to "mark" the scanned channel as a channel in "use" or "busy". The signal output from the inverter 84 thus goes low and stays at this low level during the time period that the timer 43 is in operation. The low signal from the inverter 84 thus prevents operation of the AND gate 49 and thus the output from AND gate 49 is low and it does not pass the output signal pulse provided by the delay 47. Under these signal conditions the signal output of the OR gate 50 is also low which prevents the activation of the timer 51. With timer 51 inactivated, a stop scan command is not supplied to the stop scan terminal 85 of the channel scanner 37 and the receiver 52 continues repeated scanning of the communication channels 1 thru 4 and the user apparatus continues to monitor and store the channel status information. In the condition III of the scanned channel as in condition I, activation of the transmitter 67 by PTT switch 13 activation is prevented. Only in condition II can the transmitter be activated by the PTT switch 13 so as to enable the operator to reply to the signal addressed to the user apparatus.

IV - When Signal Present

Under this condition, where a signal from another user is present on the scanned channel, the operator of the user apparatus is prevented from transmitting on the scanned channel.

Activation of the PTT switch 13 provides a high output signal at the output terminal 45. Activation of the PTT switch therefore causes the output on terminal 45 to change from a normally low level to a high level signal. This high level signal at terminal 45 is provided only during the actual time that the PTT switch 13 is being activated by the operator of the user apparatus.

When the PTT switch 13 is pressed or activated, the high signal at terminal 45 is supplied to an AND gate 56, "D type" flip-flop 59, AND gate 57, AND gate 61, and the OR gate 46. Since the timer 51 is not activated because of the presence of a signal on the scanned channel as previously described, the signal on the timer output terminal 53 is low. The low level signal from the timer 51 is inverted by inverter 88. This causes the output of AND gate 57 to go high and thus activate the audible/visible indicator 58. The indicator 58 provides an indication to the user apparatus operator that he cannot transmit on the scanned channel. The indicator can be of any desired type such as an audio oscillator keyed on by the signal from the AND gate 57 or a visual indicator.

The flip-flop 59 can be, if desired, a D-type flip-flop such as an R.C.A. CD-4013A. The operation of the flip-flop 59 is such that the logic level present on the "D" input is transferred to the "Q" output during a positive going clock pulse on the "C" clock terminal. The flip-flop 59 is clocked by the high output signal of the PTT 13 on terminal 45 and thus the Q output 60 goes to a high level. In addition, the output of AND gate 61 is caused to go to a high level since one of its inputs is supplied from the inverter 89. Inverter 89 inverts the low level signal appearing on the output terminal 53 of the inactive timer 51.

The high output signal from AND gate 61 is supplied to a differentiator 62 which provides a positive going pulse coincident with the rising or leading edge of the signal output of the PTT switch 13. The signal output of the inverter 89 is also supplied to a differentiator 90. The positive pulse from the differentiator 62 appears at the signal output 65 of the OR gate 64. This output signal of the OR gate 64 is in turn supplied to the reset terminal 86 of the channel scanner 37 thereby causing the scanner to reset at its beginning of the scan cycle. This in turn causes the receiver 52 to begin a new scan of the communication channels in search of a "free" channel for transmission from the transmitter 67 of the user apparatus.

With a signal present on the scanned channel, the remainder of the circuitry operates as previously described which activates the timer 43 and thus "marks" the scanned channel as "busy". As previously described, the timer 51 is not activated.

V - When No Signal, No Address, But Scanned Channel Is "Marked"

Under this condition, transmission on the scanned channel is prohibited as in the previously described condition IV. Since the timer 43 was activated during a previous scan of the channel, the high output of the activated timer 43 is inverted by action of the inverter 84 and in turn supplied as an input to the AND gate 49. Thus, the timer 51 is not activated and its low level output signal supplied to the circuitry described under the operation of the previous conditions prevent operation of the transmitter 67 as also previously described.

VI - PTT When No Signal Present And Scanned Channel Is Not "Marked"

Under this condition as is the case in the previously described conditions IV and V, activation of the PTT switch 13, causes the channel scanner 37 to "reset" and a new scanning cycle of the communiction channels is started. In condition VI as in the previous conditions V and IV, an assumption is made that the timer 51 is not initially activated at the start of operation.

When the PTT switch 13 is activated, the output on output terminal 45 goes from a normal non-activated state to a high state. Since the timer 51 is not activated, the output signal on terminal 53 is low. This low signal causes the output of the AND gate 57 to change to a high state and thus activates the audio/visual indicator 58. The flip-flop 59 is clocked by the high level output signal on terminal 45 of the PTT switch 13. The Q output on terminal 60 of the flip-flop 59 is thus caused to go to a high state. The output of the AND gate 61 also changes to a high state, which is in turn supplied to a differentiator 62. Differentiator 62 thus provides a positive going pulse coincident with the leading or rising edge of the signal on the output terminal 45 of the PTT switch 13. The output pulse from the differentiator 62 is supplied as an input signal to the OR gate 64. This in turn provides an output high level signal to appear on the output terminal 65 of the OR gate 64 which signal is in turn supplied to the reset terminal 86 of the channel scanner 37 causing the scanner 37 to reset and start a new scanning cycle. It should be understood that the channel scanner 37 will continue to scan and rescan for an indefinite period of time until it is either stopped by a signal on the stop terminal 85, or reset by a reset signal on terminal 86.

Again, for the purpose of operational description, when the scanner 37 reaches channel 1 which is assumed not to have been previously "marked" as "busy", the scanned channel line 38, associated with channel 1, will go to a high level from a normal non-scanning low level. As in previous descriptions, the differentiator 39 in response to the high level signal on line 38 will provide a positive going pulse to the delay 40.

Since in condition VI there is no signal or address to detect, the outputs of the signal detector 10 and the address detector 9 will both be low. These low level output signals in turn cause the signal outputs of the AND gates 35 and 36 to be low. The signal output from the delay 40 resulting from the input signal provided by the differentiator 39 will be a positive going pulse and will appear on terminal 41. Since the output signal from AND gate 36 is of low level, the signal output of AND gate 42 will also be low. Thus, AND gate 42 does not pass the positive going pulse and the "mark" timer 43 is therefore not activated. The output signal from the "mark" timer 43 thus remains low.

When the PTT switch 13 is activated, a high level output signal appears on terminal 45 during PTT activation. This high signal causes the output of the OR gate 46 to change to high level. A high level pulse output from delay 47 appears on terminal 48 and is in turn supplied to the AND gate 49. Since the output of the OR gate 46 is high, a positive pulse appears at the output of the AND gate 49. This positive pulse from AND gate 49 is in turn supplied as an input to the OR gate 50 which in turn provides a pulse to activate the timer 51.

The positive or high level output signal from the now activated timer 51 is in turn supplied as a stop scan command signal to the stop scan terminal 85 of the channel scanner 37.

With the output of timer 51 high, the output of the AND gate 57 is at a low level thus turning off the indicator 58. The high output of the timer 51 also enables the audio gate 54, the transmitter audio gate 55, and when the PTT switch 13 is activated, the output of the AND gate 56 is high which enables the transistor switch 66 to provide keying of the transmitter 67.

The one-shot multivibrator 68 is triggered "on" by the rising edge of the high output of the AND gate 56. The output of the flip-flop 59 is high at the Q terminal 60 causing the output of AND gate 69 to provide a high level signal to the enable terminal of the audio gate 70. This permits the address code which is selected and generated by the selector and generator 14 to be supplied to the audio input terminal 86 of the transmitter 67.

When the multivibrator 68 times out, the output of the AND gate 69 changes to a low level thus causing the audio gate 70 to be disabled and thereby remove the address code signal, from the select-generator 14, from the input terminal 86 of the transmitter 67. The audio signal from the microphone 6 is thus applied to the transmitter audio input terminal 86 for voice modulating the transmitter 67.

Although not likely, in certain PTT instances where the length or time period of a message transmission from the user apparatus exceeds the predetermined time period of timer 51, the channel scanner 37 could be reset during transmission. In order to prevent such an interruption, OR gate 92, and AND gate 91 is used. With the PTT switch 13 activated a high signal is supplied to an input of OR gate 92, this signal in turn provides a high level signal to occur at the output of OR gate 92. The AND gate 91 thus has high signals at both of its inputs which in turn provides a high signal to be supplied to the OR gate 50. The resulting high signal at the output of OR gate 50 in turn is supplied to the timer 51, thus maintaining the enabling of the timer 51. Thus the resulting high output signal from the timer 51 is also maintained and the stop scan signal at terminal 85 of the channel scanner 37 is also maintained, thus preventing any change in the channel being utilized for message transmission from the user apparatus described.

In addition, in any condition which causes the signal output from the timer 51 to go to a low level, the channel scanner 37 is caused to reset as follows. When the timer output signal at terminal 53 goes to a low level, the signal output of inverter 89 is caused to go to a high level. This signal transition is supplied to a differentiator 90 which like all of the other differentiators described, provides a positive going pulse at its output coincident with the input signal level transition. The pulse signal from the differentiator 90 is supplied to an input of the OR gate 64. Operation of the OR gate 64 thus provides a reset signal to appear on the reset terminal of the channel scanner 37.

Now referring to FIGS. 4a through 4f there is shown the signals which exist, as well as their timing relationships, in various indicated portions of the FIG. 3 embodiment under the previously described operating condition I through VI.

The numbers along side of the signal wave forms in FIG. 4 represent those same numbered locations shown in FIG. 3 where the signals shown exist. The roman numerals I through VI correspond to the aforementioned operating conditions I through VI under which the FIG. 4 signals exist.

It will now be appreciated that I have provided an improved communication system which uses a unique approach to trunking net radios. The system uses a combination of equipment variation and frequency management to substantially increase the spectrum efficiency of net or private radios. The method set out by my invention can be overlaid on top of existing single-channel net operations.

My system is not limited by the number of channels, however, reasonableness must take place with respect to the scan time per channel. Also, my system can operate in the same environment as single-channel equipments; it takes cognizance of their presence and avoids interfering with them. In addition, single-channel equipments could be made to communicate with my system if they were given the necessary addressing capability. However, addresses would not necessarily be needed if the individual channels were sole-user channels; whenever the presence of a signal is detected in those channels, it would be assumed that it would be an address to the net.

A Monte Carlo simulation of my system having three channels and ten nets with the same address wherein the activity per net is twenty percent and the average call length is thirty seconds showed a spectrum efficiency of sixty-five percent. Queue length and waiting times, but without scan times, were calculated for the ten nets with an activity factor of twenty percent, an average message length of thirty seconds, and an exponential distribution of message lengths and arrival times showed an average queue length of 0.66 seconds and a 95 percentile length of five seconds using four channels. This represents twenty-five users per channel with a two percent activity factor and acceptable queues. These calculations on a low number of channels are representative of worst-case conditions, however, scan time is not included.

This system can be used with citizen band frequencies, however, it will be recognized by those skilled in the art, that low frequencies have considerable noise, skip, and interference plus low net discipline. In the new 900 MHz band recently released under FCC Docket 18262, there are provisions for multi-channel systems. The system of the present invention could be used for certain classes of users, and could also be used in other VHF-FM bands, such as the current 150 MHz and 450 MHz bands. This system can best be utilized by low-activity user nets.

Consequently, while in accordance with the Patent Statutes, I have described what at present are considered to be the preferred forms of my invention it will be obvious to those skilled in the art that numerous changes and modifications may be made herein without departing from the true spirit and scope of the invention, and it is therefore aimed in the following claims to cover all such modifications.

What I claim as new and desire to secure by Letters Patent of the United States is:

1. An apparatus for enhancing use efficiency of a plurality of communication channels in a communication system comprising:
   receiving means for providing reception of signals on the communication channels;
   signal sampling means connected to the receiving means for periodically sampling the communication channels and detecting signals present on each of the channels, the signal sampling means providing signals indicative of each of the communication channels in use;
   transmitting means associated with the receiving means for providing transmission of signals on the communication channels; and
   control means connected to the transmitting means and responsive to the signals from the sampling means for preventing for a predetermined time period after the cessation of the detected signals the transmission of signals from the transmitting means on a communication channel in use thereby preventing simultaneous transmission of signals on selected ones of the communication channels.

2. The apparatus of claim 1 wherein the signal sampling means includes an address signal detector for detecting on each one of the communication channels, signals addressed to the receiving means and providing signals indicative of said detection, the combination further comprising means connected to the control means and responsive to the signals from the address detector for providing transmission of signals from the transmitting means on each one of the communication channels on which said address signals are detected whereby the transmission of signals is prevented for said predetermined time period on the communication channels on which the signals sampled by the sampling means are not addressed to the receiving means.

3. The apparatus of claim 2 further comprising means connected to the transmitting means and the signal sampling means and including a channel select means for providing transmission of signals from the transmitting means on the communication channel associated with the detected address signal.

4. In a communication system having a plurality of communication channels and a plurality of multiple channel receivers and transmitters, apparatus for selectively providing one of said communication channels for communication between at least a first and a second receiver and transmitter of said plurality comprising:
   channel scanning means connected to the first receiver for scanning a number of the plurality of communication channels by the first receiver;
   signal sampling means connected to the first receiver for sampling signals on said scanned channels and providing a signal indicative of a clear channel excluding clear channels that were occupied within a predetermind time period of said sampling;
   means connected to the scanning means and responsive to the signal indicative of a clear channel for discontinuing the scanning of said first receiver for providing reception of signal on said clear channel;
   channel selecting means connected to the first transmitter and to the sampling means for providing transmission of signals on said clear channel;
   channel scanning means connected to the second receiver for scanning a number of the plurality of communication channels including said clear channel by the second receiver;
   signal sampling means connected to the second receiver for sampling signals on said last mentioned scanned channels and including a signal detector for detecting the signal transmitted by the first transmitter on said clear channel and providing a signal indicative of said signal detection;
   means connected to the last mentioned scanning means and sampling means and responsive to the signal from the last mentioned signal detector for discontinuing the scanning of said second receiver upon detection of said signal from said first transmitter for providing continued reception of signals on the channel on which the signal from the first transmitter was detected; and
   channel selecting means connected to the second transmitter and to the last mentioned sampling means for providing transmission of signals on said last mentioned channel whereby a communication circuit between the first and second receiver and transmitter is established on said clear channel with an address being required only at the beginning of a transmission.

5. The combination of claim 4 further comprising an addressing means for generating a signal addressed to the second receiver, the addressing means connected to the first transmitter for providing transmission of said address signal on said clear channel and wherein the signal detector associated with the second receiver detects said address signal transmitted by the first transmitter.

6. In a communication system having one or more communication channels for use by a plurality of users, each one of said users being identified by an assigned address code, a method of user channel control for increasing the use efficiency of said one or more connunication channels comprising:
   sampling a number of said one or more communication channels for detecting clear channels and allowing transmission of signals from said user on said detected channels;
   sampling said number of channels for detecting channels in use by users other than said user and preventing the transmission of signals from said user on said detected channels for a predetermined time period after said detection;
   sampling said number of channels for detecting a channel having signals addressed to said user and allowing transmission of signals from said user on said detected channel; and
   periodically repeating said sampling for updating the use status of said channels.

7. A method of channel-scanning to increase spectrum efficiency of radio frequency communication channels comprising:
   scanning channels to determine availability of a channel for communication purposes;
   marking an occupied channel for a predetermined period of time after said channel becomes unoccupied;
   stopping the scanning on an unoccupied channel;
   tuning a transmitter to the frequency of the unoccupied channel; and
   receiving and transmitting a message over the unoccupied channel.

8. The method of claim 7 further including continuing scanning at completion of receiving and transmitting the message.

9. A method of determining an unoccupied communication channel or receiving a message on a channel in a radio frequency communication system comprising:
  scanning communication channels to detect a signal on one of the channels;
  sampling a detected signal to determine whether a receiver's address is included in the detected signal and stopping the receiver on the scanned channel when the address is the receiver's;
  marking the scanned channel for a predetermined time period after the cessation of said detected signal when the detected signal lacks the receiver's address; and
  stopping the scanning on a channel that is unoccupied in order to transmit a message.

10. The method of claim 9 further including resetting the scanning to a predetermined channel so that scanning will resume on the predetermined channel once scanning is continued.

11. A channel-scanning system having a receiver and a transmitter to improve the utilization of radio frequency channels comprising:
  a signal detector to determine the presence of a received signal; an address detector to determine the presence of the receiver's address; first means to scan the channels; second means to stop scanning the channels when the receiver's address is detected; channel marker means to mark a channel having a signal lacking the receiver's address for a predetermined time after the cessation of said signal; third means to determine an unmarked channel and to stop scanning on the unmarked channel; and fourth means to enable the transmitter on the unmarked channel so that a message may be transmitted.

12. The system of claim 11 further including an address encoder feeding the transmitter so that an intended receiver of a message can be identified by receiving the transmitted address.

13. The system of claim 11 further including means to cause scanning to commence on a predetermined channel upon initiation of scanning.

14. A channel-scanning system used to improve spectrum efficiency of a communication network having a receiver and a transmitter and comprising:
  a scanning receiver; a signal detector that determines the presence of a signal in a channel scanned by the scanning receiver; an address detector that determines if the signal contains the scanning receiver's address; a channel marker that marks a channel having a signal lacking the scanning receiver's address for a predetermined time period after the cessation of said signal so that the channel so marked will not be used by a transmitter associated with the scanning receiver for the predetermined time period; first means to command the scanning receiver to stop scanning when the signal contains the scanning receiver's address so that a message accompanying the address can be received; second means to command the scanning receiver to stop scanning when an unmarked channel is found so that the transmitter can be tuned to the unoccupied channel and a desired message transmitted on the unmarked channel.

15. The system of claim 14 further having means to cause scanning to commence on a predetermined channel upon re-initiation of scanning.

* * * * *